(12) United States Patent
White

(10) Patent No.: US 9,046,670 B2
(45) Date of Patent: Jun. 2, 2015

(54) MONOLITHIC POLYMER OPTICAL FIBER RIBBON

(71) Applicant: CHROMIS FIBEROPTICS, INC., Warren, NJ (US)

(72) Inventor: Whitney R. White, Watchung, NJ (US)

(73) Assignee: CHROMIS FIBEROPTICS, INC., Warren, NJ (US)

( * ) Notice: Subject to any disclaimer, the term of this patent is extended or adjusted under 35 U.S.C. 154(b) by 0 days.

(21) Appl. No.: 14/344,080

(22) PCT Filed: Oct. 19, 2012

(86) PCT No.: PCT/US2012/061036
§ 371 (c)(1),
(2) Date: Mar. 11, 2014

(87) PCT Pub. No.: WO2013/059601
PCT Pub. Date: Apr. 25, 2013

(65) Prior Publication Data
US 2014/0341519 A1 Nov. 20, 2014

Related U.S. Application Data

(60) Provisional application No. 61/548,986, filed on Oct. 19, 2011.

(51) Int. Cl.
G02B 6/44 (2006.01)
G02B 6/02 (2006.01)
G02B 6/12 (2006.01)

(52) U.S. Cl.
CPC ............ *G02B 6/4403* (2013.01); *G02B 6/4495* (2013.01); *G02B 6/02033* (2013.01); *G02B 2006/12069* (2013.01)

(58) Field of Classification Search
CPC .................. G02B 6/4403; G02B 2006/12069; G02B 6/02033; G02B 6/44955
USPC .......................................................... 385/114
See application file for complete search history.

(56) References Cited

U.S. PATENT DOCUMENTS

| 6,269,210 | B1 * | 7/2001 | Yagi et al. ...................... 385/114 |
| 7,151,879 | B2 * | 12/2006 | Ishikawa et al. ............... 385/114 |
| 2003/0044141 | A1 * | 3/2003 | Melton et al. .................. 385/114 |
| 2004/0109646 | A1 * | 6/2004 | Anderson et al. ............... 385/71 |

* cited by examiner

*Primary Examiner* — Akm Enayet Ullah
(74) *Attorney, Agent, or Firm* — Thomas|Horstemeyer, LLP

(57) ABSTRACT

The present disclosure includes an optical fiber ribbon, using polymer optical fibers and an extremely thin adhesive coating to provide adhesion between the fibers. The external surfaces of the optical fiber ribbons are precisely placed with respect to the optical cores of the constituent fibers, and the optical cores of the fibers are precisely placed with respect to each other. Therefore, the external surface of the ribbon is used as a reference surface for aligning the array of optical fiber cores to arrays of optical emitters or detectors at the ends of the ribbon. Thus, the optical fiber ribbon of the present disclosure is cut, either by a sharp blade or other tool as suitable to expose a cross-section of the ribbon, and inserted as a single unit into a receptacle that aligns the outer surface of the ribbon with respect to the array of optical emitters or detectors.

23 Claims, 2 Drawing Sheets

MONOLITHIC POLYMER OPTICAL FIBER RIBBON

CROSS-REFERENCE TO RELATED APPLICATION

This application is the 35 U.S.C. 371 national stage of PCT Application No. PCT/US2012/061036, entitled "MONOLITHIC POLYMER OPTICAL FIBER RIBBON" and filed Oct. 19, 2012, which is herein incorporated by reference in its entirety and which also claims priority to, and the benefit of, U.S. patent application 61/548,986, filed Oct. 19, 2011, which is herein incorporated by reference in its entirety.

BACKGROUND

In the field of optical communications, multiple optical data streams are commonly carried on different fibers located within the same cable. These optical fiber ribbons typically comprise two or more glass optical fibers disposed within a UV-curable adhesive (typically acrylate) matrix material. This matrix material, including the adhesive (typically acrylate) coating found on the outside of the individual fibers prior to ribbonizing, holds the fibers together. However, it does not enforce a very accurate spacing between the optical fiber cores, and it does not form a suitable surface for referencing optical emitters and detectors to the fiber cores. Accordingly, in order to use such optical fiber ribbons, the adhesive material must be stripped from the ends, so that the glass surfaces of the individual fibers may be used as a reference surface for aligning optical emitters and detectors to the fiber cores.

The prior art includes extensive efforts to simplify the process of stripping the ends of optical fiber ribbons. These include certain formulations of coatings and inks to control surface adhesion, as well as numerous mechanical and laser-based methods of coating removal and fiber end preparation. While all of these methods have resulted in simplification of the ribbon stripping process, there remains a need to further simplify the process of optical fiber ribbon termination by eliminating the stripping process entirely.

SUMMARY

Embodiments of the present disclosure, in one aspect, relate to an optical fiber ribbon structure, comprised of polymeric optical fibers, which may be terminated as a single unit without stripping.

Briefly described, embodiments of the present disclosure include an optical fiber ribbon comprising at least two polymer optical fibers, where the polymer optical fibers each comprise an optical core, at least one layer disposed around the core, and an outer surface, where a diameter of each of the optical cores is less than about 250 µm; each comprise an outer diameter, where a tolerance of the outer diameter is less than about 15 µm; are disposed parallel to each other, where a distance between the outer surface of adjacent polymer optical fibers at a point of closest approach is less than about one-tenth of the outer diameter of each of the fibers; each comprise an eccentricity, where the eccentricity comprises the distance between the geometric center of the optical core of each fiber and the geometric center of the outer surface, where the eccentricity is less than about 15 µm; and are joined with an external adhesive layer, where a thickness of the external adhesive layer at an extremal surface of the ribbon is less than about 50 µm, where the extremal surface comprises an arc on a top surface and a bottom surface of each polymer optical fiber, where the arc is defined by an angle $\theta_v$, where the angle $\theta_v$ is less than about 30 degrees; and an arc on an exterior side of each of two outside fibers, where the arc is defined by an angle $\theta_h$, where the angle $\theta_h$ is less than about 30 degrees.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
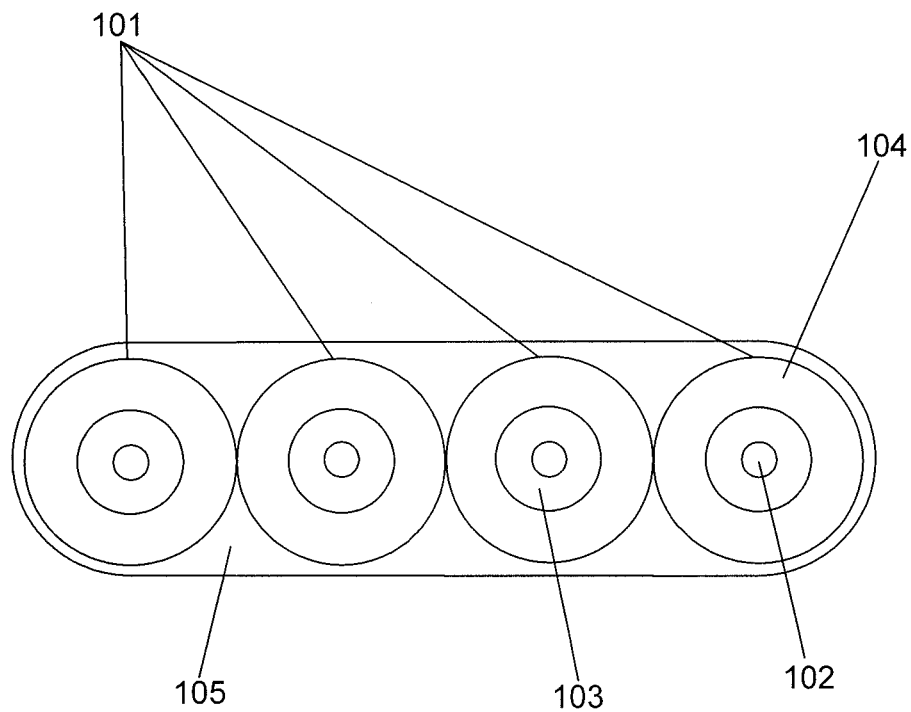
FIG. 1 is a schematic that illustrates a cross section of an optical fiber ribbon according to the prior art.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DEFINITIONS

Eccentricity is defined as the distance between the geometric center of the optical core and the geometric center of the fiber outer surface, i.e., the outer surface of the optical fiber, not including any adhesive.

Ovality of an optical fiber is defined as the ratio at any given point along the length of the largest cross-sectional dimension, divided by the smallest cross-sectional dimension minus 1. Hence, a fiber with a perfectly circular cross-section will have an ovality of exactly 0. As the cross-section begins to deviate from circularity, the ovality increases. At the point where the largest cross-sectional dimension is about 1% larger than the smallest cross-sectional dimension, the ovality will be 0.01, or 1%.

Ovality tolerance of an optical fiber is defined as the maximum ovality that is considered acceptable in the product.

Diameter tolerance of an optical fiber is defined as the maximum variation from the nominal (or target) outer diameter. For example, a fiber with a nominal outer diameter of 500

μm, may be specified to have an actual outer diameter of 500+/−5 μm, and is said to have a diameter tolerance of 5 μm.

DISCUSSION

The present disclosure pertains to a novel form of optical fiber ribbon, using polymer optical fibers and an extremely thin adhesive coating to provide adhesion between the fibers. Unlike prior art optical fiber ribbons, the optical fiber ribbons of the present disclosure are constructed in such a fashion that the external surfaces of the ribbon are very precisely placed with respect to the optical cores of the constituent fibers, and the optical cores of the fibers are very precisely placed with respect to each other. Therefore, the external surface of the ribbon is used as a reference surface for aligning the array of optical fiber cores to arrays of optical emitters or detectors at the ends of the ribbon. Thus, the optical fiber ribbon of the present disclosure is cut, either by a sharp blade or other tool as suitable to expose a cross-section of the ribbon, and inserted as a single unit into a receptacle that aligns the outer surface of the ribbon with respect to the array of optical emitters or detectors.

In the prior art ribbon design, optical fibers are surrounded by an adhesive ribbon matrix and fiber coating material which does not have the dimensional tolerances required to align the optical fiber cores with optical emitters and detectors. These coating and ribbon matrix materials are also typically too soft to provide an accurate reference surface in any case. In order to couple the fiber cores to emitters and detectors as required in an optical communication link, the adhesive material and coating must be stripped away from the fibers at the end of the ribbon. The glass surface of the constituent fibers, (which has very tight dimensional tolerances, and is very accurately located with respect to the fiber core) is then used as the reference surface to align the fiber core with respect to optical emitters and detectors. Because this stripping operation must be accomplished without significant adhesive residue remaining, and without damage to the optical fibers, it often constitutes a significant expense in the termination process for optical fiber ribbons.

According to the present disclosure, polymer optical fiber ribbons comprise an adhesive material that is limited to a comparatively thin layer on the external surfaces of the fibers. Also, the fiber surfaces, touch (or very nearly touch) each other, so that the center-to-center spacing between the optical cores is controlled almost entirely by the diameter control of the constituent fibers, which is very accurate. In the present disclosure, there are three geometric factors that determine the placement tolerance of the core centers with respect to the outer surfaces of the adhesive layer: (i.) the adhesive coating thickness, (ii.) the fiber diameter tolerance, and (iii.) the tolerance of the eccentricity of the core with respect to the outer diameter of the fiber. In the present disclosure, all are controlled so that the placement tolerances allow the outer surface of the adhesive layer to be used as a reference for alignment of fiber cores to high-speed optical detectors and emitters. Finally, in an embodiment, the diameter of the optical core is less than about 250 μm, in order to facilitate coupling of the optical cores to high speed optical detectors. As a result of these geometric factors, plus the simplified termination techniques possible with plastic optical fibers, the present disclosure overcomes problems and reduces costs inherent in usage and termination of optical fiber ribbons according to the prior art.

FIG. 1 shows an illustrative cross-section of a prior art optical fiber ribbon, typically containing glass optical fibers. In this figure, two or more optical fibers 101, comprising an optical core 102 and a cladding layer 103, and a coating layer 104, are disposed inside ribbon matrix material 105. The core 102 and cladding layer 103 are comprised of a relatively hard glassy material, typically based on silica glass, although the prior art includes glassy polymer materials as well. Said cladding layer may optionally comprise one or more sub-layers serving various optical and mechanical functions. The coating layer 104 (which is optional in the case of polymer fibers) comprises a relatively soft polymeric material, which is typically an acrylate material applied to glass fibers with a UV-cured coating during the fiber manufacturing process. The ribbon matrix material 105 is also a relatively soft polymeric material, which is typically applied by drawing all of the individual fibers 101 together through a ribbon coating die, where the ribbon matrix material 105 (typically a UV-curable acrylate) is applied with pressure, and subsequently cured, typically by UV irradiation.

The optical core 102 and the cladding layer 103 are precisely controlled in size, typically with diameter tolerances of a few microns or less. Moreover, the center of the optical core 102 is precisely located at the center of the cladding layer 103, with typically with a tolerance of less than a few microns for center-to-center offset (also known as core eccentricity). Finally the ovality of the optical core 102 and the cladding layer 103 are also very precisely controlled, with a typical ovality tolerance less than 1%. Accordingly, the center of the optical core 102 is very precisely defined by the location of the exterior surface of the cladding layer 103, so the surface of the cladding layer can be used as a reference surface for aligning optical sources and detectors with the optical core 102 of the constituent fibers 101, so that these devices can inject optical signals into the optical fibers 101 and receive optical signals carried by the optical fiber 101.

By contrast, the coating layer 104 and the matrix material 105 have dimensions that are much less precisely controlled. Typically, dimensional tolerances of these layers are ten microns or more. Also, since the cladding layer 104 and the matrix material 105 are usually applied as liquid coatings at high speeds, and since these materials are prone to potentially non-uniform dimensional changes during the curing process, it is very difficult to ensure a precise placement of the centers of the optical core 102 and optical cladding layers 103 relative to the surfaces of the coating layer 104 or the matrix material 105. Hence, tolerances for the locations of the centers of the optical cores 102 are typically tens of microns. Thus, the outer surfaces of the ribbon matrix cannot be used as a reference surface for precisely aligning the optical cores 102 with optical sources and detectors. More fundamentally, the relative softness of the coating layer 104 and the matrix material 105 render these materials prone to dimension changes due to mechanical compression, making them typically unsuitable for use as mechanical alignment surfaces in any event.

As a result of these limitations, optical fiber ribbons according to the prior art must first be "stripped" before the optical cores 102 of the constituent optical fibers 101 may be precisely aligned with optical sources or detectors. The stripping process includes using various methods (including mechanical, chemical, and laser-based techniques) to remove the coating layer 104 and the matrix material 105 over a length (typically of several millimeters) at the end of the ribbon to be terminated. This stripping reveals the external surface of the cladding layer 103 of the constituent fibers, which are then used as a reference surface for mechanical alignment of the optical cores 102 of the constituent fibers 101 with optical sources and detectors. This alignment is typically accomplished using ferrules, alignment grooves, and a variety of other devices known to those skilled in the art.

Figure 2:
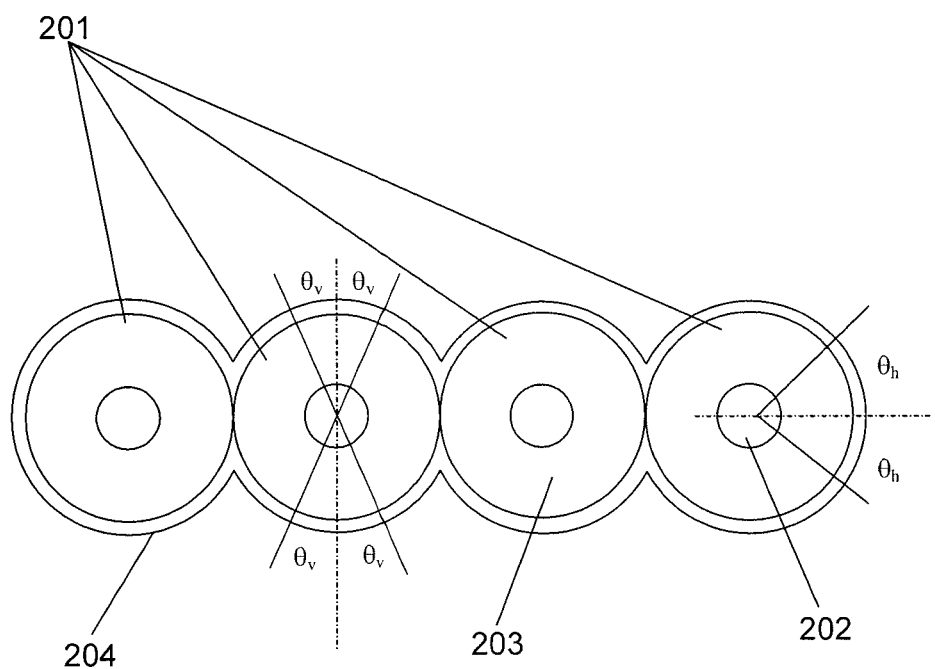
FIG. 2 is a schematic that illustrates an embodiment of a cross section of a monolithic polymer optical fiber ribbon according to the present disclosure.

The present disclosure includes an optical fiber ribbon structure, based on polymer optical fibers, which eliminates the need for stripping operations, enabling all of the optical cores of the constituent fibers in the ribbon to be aligned with optical sources and detectors, using the exterior surface of the ribbon as an alignment surface. FIG. 2 shows an illustrative cross-section of an embodiment of a polymer optical fiber ribbon according to the present disclosure.

In the polymer optical fiber ribbon according to the present disclosure, there are two or more polymer optical fibers 201 comprising an optical core 202 and a cladding layer 203, optionally with a coating layer (not shown in FIG. 2). The constituent fibers are disposed parallel to each other (in the same plane) in very close proximity (i.e., at the point of closest approach between adjacent fibers, the distance between the surfaces of the two fibers is less than about one-tenth of their nominal (outer) diameter), and are held together by a very thin adhesive material 204. The core 202 and cladding layer 203 comprise glassy (i. e., mostly amorphous) polymeric materials (examples include, but are not limited to, polymethylmethacrylate and other acrylic polymers, poly(perfluorobutenelyvinylether) and other amorphous fluorinated polymers, partially chlorinated and partially fluorinated polymers, including poly (pentafluorostyrene) poly(trichloroethylmethacrylate), partially fluorinated or partially chlorinated analogs of styrenic or acrylic polymers, co-polymers of all of the preceding materials, and all other transparent amorphous polymers with minimal crystalline content), optionally containing dopant materials to manipulate the optical refractive indices, or otherwise enhance the properties of the polymers. Examples of dopant materials often added to raise the refractive index include, but are not limited to, diphenyl sulfide, perfluorotriphenylbenzene, and other refractive-index modifying materials that are soluble in the above core polymers. Said cladding layer may optionally comprise one or more sub-layers serving various optical and mechanical functions. The innermost sub-layer of the cladding is typically chosen to have a lower refractive index than the optical core, so that light will be guided in the core material. Other sub-layers of the cladding are typically chosen for mechanical or chemical properties, such as having a high tensile modulus, or for resistance against solvent attack or hydrolysis. The adhesive material 204 is typically a relatively soft polymeric material, which is typically applied by drawing all of the individual fibers 201 together through a ribbon coating die, where the adhesive material 204 (typically a UV-curable acrylate) is applied with pressure, and subsequently cured, typically by UV irradiation.

The optical core 202 and the cladding layer 203 of the polymer optical fibers 201 are precisely controlled in size, typically with diameter tolerances of about a few microns or less. Moreover, the center of the optical core 202 is precisely located at the center of the cladding layer 203, typically with a tolerance of less than a about few microns for center-to-center offset (also known as core eccentricity). Finally, the ovality of the optical core 202 and the cladding layer 203 are also very precisely controlled, with a typical ovality tolerance less than about 1%. Accordingly, the center of the optical core 202 is very precisely defined by the location of the exterior surface of the cladding layer 203, so the surface of the cladding layer is used as a reference surface for aligning optical sources and detectors with the optical core 202 of the fiber, so that these devices inject optical signals into the fiber and receive optical signals carried by the fiber.

One of the distinguishing features of the present disclosure is the thickness and shape of the adhesive material 204. Unlike the matrix material 105 used in prior art optical fiber ribbons, the adhesive material 204, which may be of a wide range of hardness relative to the optical core 202 and cladding layer 203 materials, is constrained to a very thin layer (e.g., typically less than about 10 microns), and has a shape that conforms to that of the exterior surfaces of the cladding layers 203 of the polymer optical fibers 201 over a significant fraction of their area.

Because the adhesive material 204 of the present disclosure is extremely thin, and conforms to the surface of the constituent polymer optical fibers 201, the center of each of the optical cores 202 is very precisely defined by the location of the exterior surface of the adhesive material 204, so the surface of the adhesive material 204 can be used as a reference surface for aligning the optical cores 202 of the constituent polymer optical fibers 201, with optical sources or optical detectors, so that these devices can inject optical signals into the polymer optical fibers 201 and receive optical signals carried by the polymer optical fibers 201. Even if the adhesive material 204 is relatively soft, compressive forces cannot significantly affect this alignment, because the thickness of the adhesive material 204 is very thin. Also, because the layer of adhesive material 204 is thin compared to the radius of the optical cores 202, even if the adhesive material 204 has thickness variations which are substantial (as a fraction of mean adhesive material 204 thickness), the alignment will not be significantly affected.

Hence, embodiments of the present disclosure achieve the purpose of providing a ribbon structure for polymer optical fibers, where all of the optical cores 202 of the constituent polymer optical fibers 201 may be simultaneously aligned with optical sources or detectors, using the external surface of the ribbon as reference surface, without any need for removal of the adhesive material at the terminus of the ribbon. The alignment between the exterior surface of the optical ribbon and the optical sources and detectors is accomplished by means of precision-molded fixtures or other methods known to those skilled in the art.

What has been described is merely illustrative of the application of the principles of the present disclosure. Thus, it should be understood that the detailed structure of each of the polymeric optical fibers 201 could include a variety of additional concentric layers, provided that such additional layers do not significantly impair the ability to use the external surface of the adhesive material 204 as a reference surface for locating the optical cores 202 of the constituent polymer optical fibers 201. Moreover, each of the constituent polymer optical fibers 201 may contain more than one optical core, provided that each of the polymer optical fibers 201 is rotationally oriented with respect to the external surface of the adhesive material 204 in a manner such that the location of each of the optical cores may be accurately determined using the external of the adhesive material 204 as a reference surface. Hence, other arrangements can be implemented by those skilled in the art without departing from the spirit and scope of the present disclosure.

Embodiments of the present disclosure include an optical fiber ribbon comprising at least two polymer optical fibers, where the polymer optical fibers each comprise an optical core, at least one layer disposed around the core (e.g., a cladding layer), and an outer surface (which is defined by the outermost layer, not including the adhesive layer), where a diameter of each of the optical cores is less than about 250 µm; each comprise an outer diameter, where a tolerance of the outer diameter is less than about 15 µm; are disposed parallel to each other, where a distance between the outer surface of adjacent polymer optical fibers at a point of closest approach is less than about one-tenth of the outer diameter of each of the fibers; each comprise an eccentricity, where the eccentricity comprises the distance between the geometric center of the optical core of each fiber and the geometric center of the outer surface, where the eccentricity is less than about 15 µm; and are joined with an external adhesive layer, where a thickness of the external adhesive layer at an extremal surface of the ribbon is less than about 50 µm, where the extremal surface comprises an arc on a top surface and a bottom surface of each polymer optical fiber, where the arc is defined by an angle $\theta_v$ (as illustrated in FIG. 2), where the angle $\theta_v$ is less than about 30 degrees; and an arc on an exterior side of each of two outside fibers, where the arc is defined by an angle $\theta_h$ (as illustrated in FIG. 2), where the angle $\theta_h$ is less than about 30 degrees. In an embodiment, the angle $\theta_v$ is about 5 to 30 degrees. In another embodiment, the angle $\theta_h$ is about 5 to 30 degrees.

Embodiments of the present disclosure include an optical fiber ribbon where the diameter of each of the optical cores is about 8 to 250 µm. In another embodiment, the optical fiber ribbon comprises about 2 to 24 polymer optical fibers.

In an embodiment of the present disclosure the distance between the outer surface of adjacent polymer optical fibers at the point of closest approach is less than about 10 µm, the tolerance of the outer diameter is less than about 10 µm, the eccentricity is less than about 10 µm, and the thickness of the external adhesive layer at the extremal surfaces of the ribbon is less than about 10 µm. In another embodiment, the distance between the outer surface of adjacent polymer optical fibers at the point of closest approach is less than about 5 µm, the tolerance of the outer diameter is less than about 5 µm, the eccentricity is less than about 5 µm, and the thickness of the external adhesive layer at the extremal surfaces of the ribbon is less than about 10 µm. In another embodiment, the eccentricity is about 0 to 15 µm.

Embodiments of the present disclosure include an optical fiber ribbon where the diameter of each of the optical cores is less than about 150 µm. In an embodiment, the diameter of each of the optical cores is less than about 100 µm. In another embodiment, the diameter of each of the optical cores is less than about 70 µm.

Embodiments of the present disclosure include an optical fiber ribbon where at least one of the polymer optical fibers comprises a step-index polymer optical fiber. In an embodiment, at least one of the polymer optical fibers comprises a graded-index polymer optical fiber.

Embodiments of the present disclosure include an optical fiber ribbon where at least one of the polymer optical fibers comprises an optical core comprised of perfluorinated polymers and where the at least one layer comprises a cladding layer comprised of perfluorinated polymers.

Embodiments of the present disclosure include an optical fiber ribbon where at least one of the polymer optical fibers comprises an optical core comprised of polymers containing at least about 10% chlorine by weight. In an embodiment, at least one of the polymer optical fibers comprises an optical core comprised of polymers containing at least about 10% fluorine by weight. In another embodiment, at least one of the polymer optical fibers comprises an optical core comprised of polymers comprised of less than about 10% by weight of chlorine. In another embodiment, at least one of the polymer optical fibers comprises an optical core comprised of polymers comprised of less than about 10% by weight of fluorine.

EXAMPLES

Example 1

An optical fiber ribbon comprised of 6 optical fibers, each with an outer diameter of about 250+/−5 µm. In each of the optical fibers, the optical core comprises poly(perfluorobutenylvinylether), doped with perfluorotriphenylbenzene to form a graded refractive index profile with a diameter of about 80 µm, and center refractive index of about 1.357. In each fiber, the inner cladding layer comprises undoped poly(perfluorobutenylvinylether) with a diameter of about 105 µm, and a refractive index of about 1.342, and an outer cladding layer comprising a polycarbonate/polyester blend, sold commercially by Sabic Innovative Plastics under the trade name XYLEX® X7200.

The adhesive material used to hold the fibers together comprises a UV-cured aliphatic urethane acrylate resin sold by Bayer Material Science, LLC under the trade name DESMOLUX® U100. The thickness of this adhesive material at the extremal surfaces is about 8 µm.

Example 2

An optical fiber ribbon comprised of 4 optical fibers, each with an outer diameter of about 600+/−5 µm. In each of the fibers, the optical core comprises poly(perfluorobutenylvinylether), doped with perfluorotriphenylbenzene to form a graded refractive index profile with a diameter of about 62 µm, and center refractive index of about 1.357. In each fiber, the inner cladding layer comprises undoped poly(perfluorobutenylvinylether) of with a diameter of about 105 µm, and a refractive index of about 1.342, and an outer cladding layer comprised of a polycarbonate/polyester blend, sold commercially by Sabic Innovative Plastics under the trade name XYLEX® X7200.

The adhesive material used to hold the fibers together comprises a UV-cured elastomeric acrylate resin sold by DSM Desotech under the trade name CABLELITE® 3287-9-41. The thickness of this adhesive material at the extremal surfaces is about 10 µm.

Example 3

An optical fiber ribbon comprised of 4 fibers, each with an outer diameter of about 490+/−5 µm. In each of the fibers, the optical core comprises poly(trichloroethylmethacrylate), doped with diphenyl sulfide to form a graded refractive index profile with a diameter of about 120 µm, and center refractive index of about 1.524. In each fiber, the inner cladding layer comprises poly(methylmethacrylate) with a diameter of about 200 µm, and a refractive index of about 1.49, and an outer cladding layer comprising a polycarbonate.

The adhesive material used to hold the fibers together is a UV-cured aliphatic urethane acrylate resin sold by Bayer Material Science, LLC under the trade name DESMOLUX® U100. The thickness of this adhesive material at the extremal surfaces is about 10 µm.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In an embodiment, the term "about" can include traditional rounding according to the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein within the scope of this disclosure and protected by the following claims.

Therefore, at least the following is claimed:

1. An optical fiber ribbon comprising:
    at least two polymer optical fibers, wherein the polymer optical fibers:
        each comprise an optical core, at least one layer disposed around the core, and an outer surface, wherein a diameter of each of the optical cores is less than about 250 µm;
        each comprise an outer diameter, wherein a tolerance of the outer diameter is less than about 15 µm;
        are disposed parallel to each other, wherein a distance between the outer surface of adjacent polymer optical fibers at a point of closest approach is less than about one-tenth of the outer diameter of each of the fibers;
        each comprise an eccentricity, wherein the eccentricity comprises the distance between the geometric center of the optical core of each fiber and the geometric center of the outer surface, wherein the eccentricity is less than about 15 µm; and
        are joined with an external adhesive layer, wherein a thickness of the external adhesive layer at an extremal surface of the ribbon is less than about 50 µm, wherein the extremal surface comprises:
            an arc on a top surface and a bottom surface of each polymer optical fiber, wherein the arc is defined by an angle $\theta_v$, wherein the angle $\theta_v$ is less than about 30 degrees; and
            an arc on an exterior side of each of two outside fibers, wherein the arc is defined by an angle $\theta_h$, wherein the angle $\theta_h$ is less than about 30 degrees.

2. An optical fiber ribbon comprising:
    at least two polymer optical fibers, wherein the polymer optical fibers:
        each comprise an optical core, at least one layer disposed around the core, and an outer surface, wherein a diameter of each of the optical cores is less than about 250 µm;
        each comprise an outer diameter, wherein a tolerance of the outer diameter is less than about 10 µm;
        are disposed parallel to each other, wherein a distance between the outer surface of adjacent polymer optical fibers at a point of closest approach is less than about 10 µm;
        each comprise an eccentricity, wherein the eccentricity comprises the distance between the geometric center of the optical core of each fiber and the geometric center of the outer surface, wherein the eccentricity is less than about 10 µm; and
        are joined with an external adhesive layer, wherein a thickness of the external adhesive layer at an extremal surface of the ribbon is less than about 10 µm, wherein the extremal surface comprises:
            an arc on a top surface and a bottom surface of each polymer optical fiber, wherein the arc is defined by an angle $\theta_v$, wherein the angle $\theta_v$ is less than about 30 degrees; and
            an arc on an exterior side of each of two outside fibers, wherein the arc is defined by an angle $\theta_h$, wherein the angle $\theta_h$ is less than about 30 degrees.

3. An optical fiber ribbon comprising:
    at least two polymer optical fibers, wherein the polymer optical fibers:
        each comprise an optical core, at least one layer disposed around the core, and an outer surface, wherein a diameter of each of the optical cores is less than about 250 µm;
        each comprise an outer diameter, wherein a tolerance of the outer diameter is less than about 5 µm;
        are disposed parallel to each other, wherein a distance between the outer surface of adjacent polymer optical fibers at a point of closest approach is less than about 5 µm;
        each comprise an eccentricity, wherein the eccentricity comprises the distance between the geometric center of the optical core of each fiber and the geometric center of the outer surface, wherein the eccentricity is less than about 5 µm; and
        are joined with an external adhesive layer, wherein a thickness of the external adhesive layer at an extremal surface of the ribbon is less than about 10 µm, wherein the extremal surface comprises:
            an arc on a top surface and a bottom surface of each polymer optical fiber, wherein the arc is defined by an angle $\theta_v$, wherein the angle $\theta_v$ is less than about 30 degrees; and
            an arc on an exterior side of each of two outside fibers, wherein the arc is defined by an angle $\theta_h$, wherein the angle $\theta_h$ is less than about 30 degrees.

4. The optical fiber ribbon of claim 1, wherein the diameter of each of the optical cores is less than about 150 µm.

5. The optical fiber ribbon of claim 2, wherein the diameter of each of the optical cores is less than about 150 µm.

6. The optical fiber ribbon of claim 3, wherein the diameter of each of the optical cores is less than about 150 µm.

7. The optical fiber ribbon of claim 1, wherein the diameter of each of the optical cores is less than about 100 µm.

8. The optical fiber ribbon of claim 2, wherein the diameter of each of the optical cores is less than about 100 µm.

9. The optical fiber ribbon of claim 3, wherein the diameter of each of the optical cores is less than about 100 µm.

10. The optical fiber ribbon of claim 1, wherein the diameter of each of the optical cores is less than about 70 µm.

11. The optical fiber ribbon of claim 2, wherein the diameter of each of the optical cores is less than about 70 µm.

12. The optical fiber ribbon of claim 3, wherein the diameter of each of the optical cores is less than about 70 µm.

13. The optical fiber ribbon of claim 1, wherein at least one of the polymer optical fibers comprises a step-index polymer optical fiber.

14. The optical fiber ribbon of claim 2, wherein at least one of the polymer optical fibers comprises a step-index polymer optical fiber.

15. The optical fiber ribbon of claim 3, wherein at least one of the polymer optical fibers comprises a step-index polymer optical fiber.

16. The optical fiber ribbon of claim 1, wherein at least one of the polymer optical fibers comprises a graded-index polymer optical fiber.

17. The optical fiber ribbon of claim 2, wherein at least one of the polymer optical fibers comprises a graded-index polymer optical fiber.

18. The optical fiber ribbon of claim 3, wherein at least one of the polymer optical fibers comprises a graded-index polymer optical fiber.

19. The optical fiber ribbon of claim 1, wherein at least one of the polymer optical fibers comprises an optical core comprised of perfluorinated polymers and wherein the at least one layer comprises a cladding layer comprised of perfluorinated polymers.

20. The optical fiber ribbon of claim 1, wherein at least one of the polymer optical fibers comprises an optical core comprised of polymers containing at least about 10% chlorine by weight.

21. The optical fiber ribbon of claim 1, wherein at least one of the polymer optical fibers comprises an optical core comprised of polymers containing at least about 10% fluorine by weight.

22. The optical fiber ribbon of claim 1, wherein at least one of the polymer optical fibers comprises an optical core comprised of polymers comprised of less than about 10% by weight of chlorine.

23. The optical fiber ribbon of claim 1, wherein at least one of the polymer optical fibers comprises an optical core comprised of polymers comprised of less than about 10% by weight of fluorine.

* * * * *